US012477263B2

(12) United States Patent
Hansen et al.

(10) Patent No.: US 12,477,263 B2
(45) Date of Patent: Nov. 18, 2025

(54) HEADSET WITH DETACHABLE ARM

(71) Applicant: EPOS Group A/S, Ballerup (DK)

(72) Inventors: Martin Feilberg Hansen, Ballerup (DK); Christian Wang, Ballerup (DK); Johnny Skiffard, Ballerup (DK)

(73) Assignee: EPOS Group A/S, Ballerup (DK)

( * ) Notice: Subject to any disclaimer, the term of this patent is extended or adjusted under 35 U.S.C. 154(b) by 119 days.

(21) Appl. No.: 17/853,157

(22) Filed: Jun. 29, 2022

(65) Prior Publication Data

US 2023/0007382 A1 Jan. 5, 2023

(30) Foreign Application Priority Data

Jun. 30, 2021 (EP) .................................... 21182883

(51) Int. Cl.
*H04R 1/10* (2006.01)

(52) U.S. Cl.
CPC ......... *H04R 1/1041* (2013.01); *H04R 1/1008* (2013.01); *H04R 2420/09* (2013.01)

(58) Field of Classification Search
CPC . H04R 1/1041; H04R 1/1008; H04R 2420/09
See application file for complete search history.

(56) References Cited

U.S. PATENT DOCUMENTS 6,427,018 B1 * 7/2002 Keliiliki ............... H04R 1/1066 381/381
10,805,703 B1 * 10/2020 Bikumala .............. H04R 5/033
2009/0268935 A1 10/2009 Dillinger
2010/0022281 A1 * 1/2010 Cohen .................... H04B 1/385 455/569.1
2010/0081377 A1 * 4/2010 Chatterjee ............. G06F 1/1632 455/41.1
2012/0070027 A1 * 3/2012 Ridler .................. H04R 1/1058 381/374
2014/0077044 A1 3/2014 Witter et al.
2014/0270228 A1 * 9/2014 Oishi ................... H04R 1/1008 381/74

(Continued)

FOREIGN PATENT DOCUMENTS

CN 203896488 U 10/2014
EP 3 588 973 A1 1/2020

OTHER PUBLICATIONS

Machine Translation, "CN203896488—Headphone Device", Oct. 22, 2014, WIPO, https://patentscope.wipo.int/search/en/detail.jsf?docId=CN158561686, pp. 1-4. (Year: 2014).*

(Continued)

*Primary Examiner* — Daniel R Sellers
(74) *Attorney, Agent, or Firm* — Birch, Stewart, Kolasch & Birch, LLP

(57) ABSTRACT

The present disclosure relates to a headset which is configured to receive a detachable arm, wherein the detachable arm comprises an arm input transducer. The headset may be configured to be operated in different modes depending on the arm being attached or not. The headset may be configured to detect if the arm is attached or not. A set of magnets may be used to keep the arm attached to the earcup while allowing a user to detach the arm from the earcup.

10 Claims, 3 Drawing Sheets

(56) References Cited

U.S. PATENT DOCUMENTS

| | | | | |
|---|---|---|---|---|
| 2015/0382101 | A1* | 12/2015 | Dai | H04R 1/1091 381/375 |
| 2016/0198254 | A1 | 7/2016 | Gecawicz et al. | |
| 2018/0213313 | A1* | 7/2018 | Andrikowich | H04R 1/083 |
| 2018/0234532 | A1 | 8/2018 | Meyberg et al. | |
| 2018/0270565 | A1 | 9/2018 | Ganeshkumar | |
| 2022/0400330 | A1* | 12/2022 | Carlile | H04R 1/1016 |
| 2022/0417639 | A1* | 12/2022 | Wilson | H04R 1/1041 |

OTHER PUBLICATIONS

Search Report issued in European priority application 21182883.5, dated Apr. 25, 2022.

European Communication pursuant to Article 94(3) EPC for European Application No. 22 181 743.0, dated Feb. 25, 2025.

* cited by examiner

HEADSET WITH DETACHABLE ARM

FIELD

The present disclosure relates to a headset, or earphones, having a detachable arm. More particularly, the disclosure relates to a headset, or earphones, having a detachable arm, where the arm is attached to a part of the headset or earphone via one or more magnets. Further, according to the present disclosure, such a headset may comprise a multitude of microphones, where at least one microphone is arranged in or on the arm.

BACKGROUND

A headset may be used by a person as hands-free personal communication device, e.g. during gaming or other entertainment or communication activity. Generally, such headsets for hands-free personal communication devices may be used in a variety of known work and personal environments. In general, hands-free personal communication devices are useful in any application where it is desirable to provide one-way or two-way communication that leaves the user's hands free and performs a variety of other tasks.

The present disclosure provides at least an alternative to the prior art.

SUMMARY

According to an aspect, the present disclosure provides a headset comprising a headband and an earcup. A recess may be formed in or at the earcup. An arm may be arranged detachably connectable to the earcup via the recess. The arm may be a boom arm. The arm may comprise one or more input transducers. The one or more input transducers may be arranged so that when the headset is positioned on the head of a user, the one or more transducers may be arranged to pick up sound mainly from the mouth of the user.

Presently, it is preferred that a headset according to the present disclosure provides an output signal based on one or more microphones in, or connected to the headset, which output signal comprises the user's/wearer's voice. This output signal is then preferably provided to a device, e.g., a computer, mobile phone, video game console or the like. The wearer's voice may then be transmitted to a far-end receiver, e.g., another player in a game or a remote person in a telephone call, either phone-based or data-connection, such as video conferencing software and/or video conferencing hardware and/or softphone connection.

The output signal, or simply signal, representing or comprising the user's voice may be filtered and/or processed in order to provide a relatively clean speech signal. The headset may be configured to use beamforming techniques to pick up sounds or utterances from the user wearing the headset. Such a beamformer may be established using two or more microphones of the headset, e.g., two microphones in a earcup of the headset or one microphone in an earcup and one in an arm attached to the earcup, or two microphones in an arm attached to the headset or combinations thereof.

A headset according to the present disclosure may include first and second earcups connected by a headband which is intended to sit across the head of the wearer. The earcup may be dismountable from the headband. The first and/or second earcup may be pivotable so that they may conform better to the individual head shape of the wearer and/or provide a tighter fit to the head of the user/wearer.

The arm may be detachably connected to the earcup, e.g. so that one or more magnets in the earcup may be arranged to attract one or more metallic members in the arm. Alternatively, one or more magnets in the arm may be arranged to attract one or more metallic members in the earcup. Further alternatively, one magnet in the earcup may be arranged to attract one metallic member in the arm and one magnet in the arm may be arranged to attract one metallic member in the earcup. When more than one member is present in the arm and/or the more than one member in the earcup, is present, such members may be arranged e.g. opposite each other, next to each other, such as perpendicular to each other. Two magnets and/or metallic members may be arranged symmetrically around a protraction configured to be received in the recess of a earcup in a headset according to the present disclosure. One magnet may be arranged so as to encircle the recess in the earcup and/or one magnet may be arranged so as to encircle a protrusion on the arm configured to engage with the recess in the earcup.

At area of the arm configured to connect to the recess, the arm may comprise electrical connections configured to engage with corresponding connections at the earcup, e.g., in the form of pads or sockets.

The recess may be arranged in a rotatable member in the earcup. This could allow the arm to be positioned in at least two positions during use, e.g. an active state or position where the arm is arranged generally so that one or more microphones are able to pick up sound from the user's mouth, and a mute state where, owing to the position of the arm, signals from at least the one or more microphones in the arm is muted so that privacy of the user is ensured. This could e.g. be a slightly angled position relative to horizontal for the first mode, and an angle of at least 45 degrees from horizontal for the second mode. This allow the user to lower the arm when wishing to speak via microphones in the arm and raise the arm when not whishing speech to be transmitted via the headset. During e.g. gaming this could be useful for situations where the user speaks with persons in the same room and do not wish this conversation to be transmitted via a game or communication software or the like.

The headset or headphones described herein may include one or more additional microphones arranged on or in an earcup. This would allow the headset to base an output signal on signals from the one or more microphones in the arm and signals from the one or more additional microphones in the earcup. The headset may have two earcups.

A wired or a wireless interface may be provided. Though such a connection, the headset may communicate a signal representing the user's voice to an external device, such as a computer or a mobile phone, and the headset may receive a signal to be reproduced via an earcup. The signal to be reproduced to the user/wearer may be a stereo signal, a mono signal or a multi-channel signal. The headset may comprise a processor with capabilities to transform a signal received from an external device from one format to another, including transforming the signal from having one set of channels to a signal having a different set of channels. This could include reducing the number of channels prior to supplying audio to the user or increasing the number of channels prior to providing audio to the user.

When the headset comprises two earcups, e.g., a first earcup and a second earcup, and a multitude of microphones, there is the possibility that in at least the following configurations active microphone signals from the following microphones are used as a basis for the headsets output signal:

one microphone could be arranged in the first earcup and no microphone in the second earcup
one microphone could be arranged in each earcup,
at least two microphones could be arranged in the first earcup, and no microphones in the second earcup,
at least two microphones could be arranged in the first earcup and at least one microphone could be arranged in the second earcup,
one microphone in the arm and at least one microphone in the first earcup and/or the second earcup.

Similar set could be defined if the headset comprised only one earcup. The microphones mentioned above could be input transducers arranged as omni directional microphones or directional microphones. E.g., a directional input transducer could be arranged at the first earcup, while an omni directional microphone could be arranged in the arm.

The headset could thus be configured to provide an output signal based on one, two or more of the above listed microphone configurations. The output signal could be provided wired or wirelessly to an external device. The external device could be a computer device, a mobile phone device, a hand-held device, such as a hand-held gaming device or other suitable device.

The headset according to the present disclosure, where the headset comprises at least one earcup and a headband, where the at least one earcup comprises at least one microphone, the headset being configured to engage with a detachable arm having at least one microphone, could be configured so that when the arm is attached to the headset, the headset could be configured to operate in a first mode where an output signal is based on a signal from the at least one microphone in the earcup and the at least one microphone in the arm, and when the arm is not attached, the headset could be configured to operate in a second mode were an output signal is based on the at least one microphone in the earcup alone. The headset could be configured to seamlessly switch between two such modes, pending a detection of the arm being attached or detached. Detecting that the arm is attached or not could be achieved via a contact, such as a capacitive contact configured to sense the presence of the arm, an electrical contact configured to sense signals between, such as to and/or from, the arm and the headset, a processor in the headset may be configured to determine if a signal is present on a microphone connection between the headset and the arm.

In situations where the arm is not attached to the earcup, a cover plate may be attached. This could provide a protection against dust and/or debris, which could hinder connection force and/or reduce electrical connection stability. The cover plate may be attached via one or more magnets in or on the cover plate or as mechanical interface that temporarily attach the cover plate to the earcup/headset. A mechanical interface could be a protrusion configured to fit into a recess of the earcup, e.g., where the arm is configured to attach to the earcup.

A range of mechanic stops may be provided in a rotation arrangement in an earcup of a headset. This could provide a differentiation between functions in the headset. One stop could be around −40 degree relative to horizontal, in which position the arm would provide a microphone signal to a processor in the headset.

A headset may comprise an active noise cancellation or reduction function, where a signal from a microphone provides an input to a filter configured to provide a signal that (at least substantially) cancel noise at/in the earcup.

An earcup of a headset may comprise an opening adjacent to an annular cushion, where the cushion is configured to provide a comfortable interface with the skin of the wearer during use of the headset.

The headset may comprise a touch interface, e.g. at an earcup not being configured to receiving a detachable arm. Such a touch interface could comprise a capacitive interface, an accelerometer, or comprise other suitable sensor to detect input of a user.

The headset may comprise an antenna for providing wireless communication between the headset and an external device, such as a phone, computer, tablet computer or the like. The antenna may be formed in an earcup, the headband, both in an earcup and in the headband, partly in the detachable arm and/or in two earcups. The antenna may be configured to operate in the range of 2 to 6 GHz, such as at 2.4 GHz, or other suitable frequency. Wireless communication may be provided via a protocol such as Bluetooth, Bluetooth Low Energy, or other suitable protocol.

The present disclosure also relates to a kit of parts comprising a headset and a detachable arm. The present disclosure further relates to a kit of parts comprising a headset, a detachable arm and a cover plate.

The present disclosure provides a method of operating a headset comprising an earcup and a detachable arm, where the earcup comprises an earcup input transducer and the arm comprises an arm input transducer. The method may then comprise detecting the presence or absence of the arm being attached to the earcup, and operating the headset accordingly. This could be to operate the headset in a first mode if the arm is detected as attached and in a second, different, mode if the arm is not detected as attached. The first mode could then mean that a processor in the headset establishes an output signal based on the earcup input transducer and the earcup input transducer. The output signal could be processed so that it comprises signals representing speech of the person wearing the headset. This could allow the headset to operate as a voice input device for a telephone, a computer, a tablet or the like.

The method may include, in an attached configuration, to detect a position of the arm relative to the earcup, and if the arm is in a first orientation relative to the earcup to mute all signals from input transducers, and in a second, different, orientation of the arm relative to the earcup, allow signals from the arm input transducer and/or earcup input transducer to be used to establish the output signal.

The method may include to operate the headset according to the additional, optional, features of the headset as disclosed herein.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
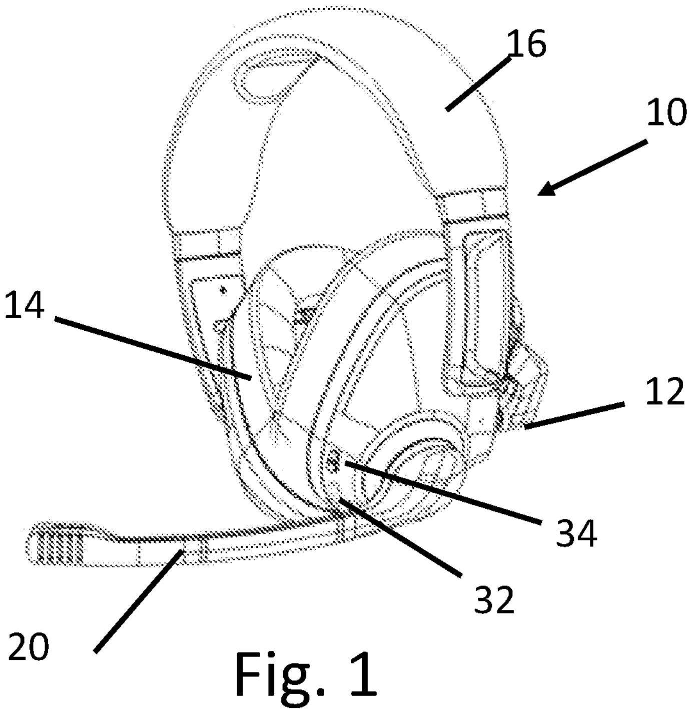
FIG. 1 schematically illustrates a headset with a detachable boom arm.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A headset according to the present disclosure may comprise i) an input unit such as a microphone for receiving an acoustic signal from a user's surroundings and providing a corresponding input audio signal, and/or ii) a receiving unit for electronically receiving an input audio signal. The headset may further include a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. A, relatively, fixed direction may be preferred, e.g. for a directional input transducer located on or in an earcup, where the directional input transducer is configured to mainly pick up signals from a direction where the mouth of the person wearing the headset is assumed to be located. This will allow the headset to pick up a signal representing the user's voice. The signal processing unit may include an amplifier that is adapted to apply a frequency dependent gain to the input audio signal. The signal processing unit may further be adapted to provide other relevant functionality such as compression, noise reduction, etc.

FIG. 1 schematically illustrates a headset 10 having a first 12 and a second 14 earcup. The two earcups 12,14 are configured to be placed over the ears of a wearer. The first 12 and the second 14 earcup are connected by a headband 16. The headband 16 may be adjustable, e.g., via a slide configured to lengthen or shorten the headband 16, at least the headband 16 is, somewhat, flexible so as to allow a comfortable fit to the user's head. Other adjustment mechanisms may be employed. The earcups 12, 14 comprise a pad to provide both a comfortable interface to the user's skin and to provide an at least partial, passive, dampening of sound from the environment of the user.

Figure 2:
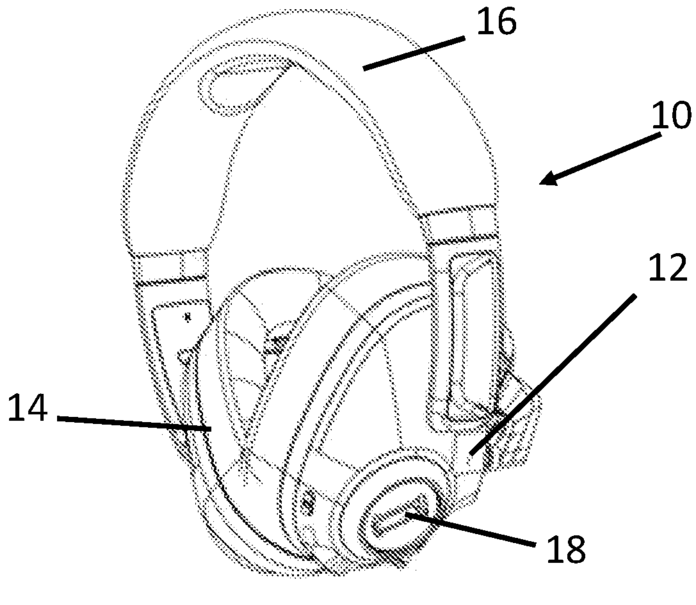
FIG. 2 schematically illustrates a headset with a recess for receiving a detachable boom arm, FIG. 3 schematically illustrates a headset with a cover plate, FIG. 4 schematically illustrates a detachable boom arm for a headset, and FIG. 5 schematically illustrates an interface between a detachable boom arm and a headset.

The first earcup 12 comprises a recess 18, visible in FIG. 2, which is configured to connected to a connected part of an arm 20. In FIG. 2 the headset 10 with an attached arm 20 is illustrated. Although illustrated with two earcups 12, 14, the second earcup 14, opposite the first earcup 12, may be omitted. The shape and/or size of the earcup or earcups may be varied other than what is illustrated.

The first earcup 12 further comprises a slide switch 32 and a button 34. The button 34 provides an interface for the user to e.g. initiate Bluetooth pairing, and/or other functions, such as changing between sound programs/settings. The slide switch 32 provides an interface for the user to change between active noise cancellation settings, e.g., off and on, or between levels or degrees of active noise cancellation. An electrical interface in the form of a plug is provided. This interface allows the user/wearer to recharge a battery in the headset 10 so that the headset may operate wirelessly. The electrical interface may also be used to provide a wired interface to e.g. a computer for providing a signal representing sound to be played in the headset and/or a signal representing speech to be transmitted out of the headset 10 to a computer.

Figure 4:
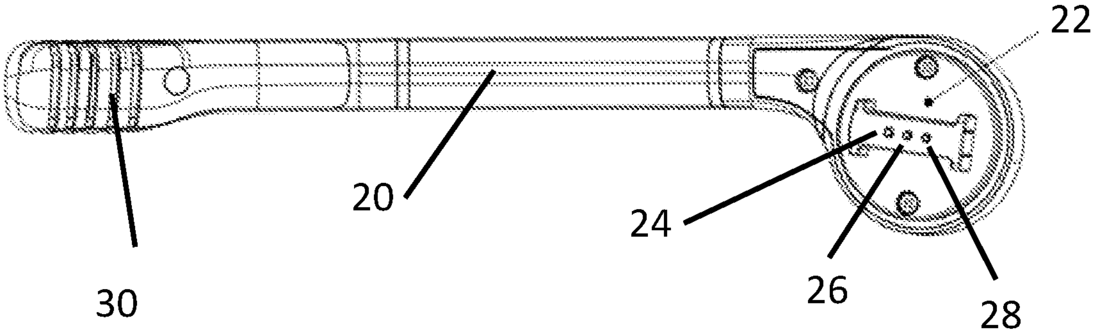

The recess 18 comprises an electrical socket and the arm 20 comprises a corresponding plug 22, illustrated in FIG. 4. Advantageously, the socket/recess 18 and plug 22 may be or comprise a USB-type connection, such as a mini-USB, USB-C or other USB type connection. In the figure, electrical connection is established via a set of pogo pins, 24, 26, 28.

The contacts, i.e. here the pogo pins 24, 26 and 28, are placed on a raised part which is shaped to mate with a receptacle formed in the outer surface of the earcup. The raised part constitutes a mechanical interface as discussed below.

FIG. 4 schematically illustrates a detachable boom arm 20 for a headset 10. In the present text, the terms arm, boom arm, detachable arm and detachable boom arm, these are all intended to refer to the same entity. The arm 20 comprises one microphone 30 arranged at a distal end of the arm 20, i.e., remote from the plug part 22. The arm 20 is shaped so that the microphone 30 is placed near the mouth of the wearer when the arm 20 is arranged substantially vertical or below. A lower position would also reduce noise induced by the wearer exhaling which still being able to pick up sound in a favorable position. Here the microphone is positioned behind five grooves or slits.

When the arm 20 is connected to the headset, the headset 10 is configured to operate in different modes based on the orientation of the arm relative to the first earcup 12. This could allow the arm to be positioned in at least two positions during use, e.g. an active state or position where the arm is arranged generally so that one or more microphones are able to pick up sound from the user's mouth, and a mute state where, owing to the position of the arm, signals from at least the one or more microphones in the arm is muted so that privacy of the user is ensured.

A range of mechanic stops may be provided in a rotation arrangement in an earcup of a headset. This could provide a differentiation between functions in the headset. One stop could be around −40 degree relative to horizontal, in which position the arm would provide a microphone signal to a processor in the headset.

Included in the earcup 12, a limit switch is arranged so that the limit switch will be activated when the boom arm 20 is in position about 70 degrees, in which position the limit switch will touch a protrusion so that the microphone mute function is activated. At the same time, a metal spring will abut at another point, and a rib will produce a sound to provide a tactile feedback to the user, and thus provide a better feel for the user, altering or informing the user that the microphone, or microphones, is muted. Similar feedback to the user is provided when the arm 20 is moved in the reverse direction and passes the about 70 degree position.

When the arm 20 is at around 95 degrees, a further protrusion restricts further rotation. When the arm 20 is at around −40 degrees, a still further protrusion restricts further rotation, thereby a rotation range of from about 95 degrees to around −40 degrees is established, yielding a range of about 135 degrees of rotation for the arm 20.

FIG. 2 schematically illustrates the headset 10 with a recess 18 for receiving the detachable boom arm 20. When the arm 20 is not connected to the headset 10, the headset 10 is configured to operate in a mode where the headset 10 provides a signal based on an output signal from a microphone in the first earcup 12. This signal should mainly comprise the wearer's voice. Such a signal is then provided via a wireless, or wired, connection to an external device. The external device may be a computer device, a mobile phone or the like. As illustrated in FIG. 2, the recess is here overall rectangular shaped. Further, at one end a first structural feature is provided, and at the opposite, second end of the recess, a second structural feature is provided. The first and second structural features are different. These two different shapes or geometries provide an assurance that the user is not able to attach the arm in a non-intended orientation, thus also ensuring proper electrical connection between the arm and the headset. The overall oblong shape of the recess also provides an improved rotational properties to the arm/headset interface. The user is able to rotate the arm into different positions so as to achieve different modes of operation.

Figure 3:
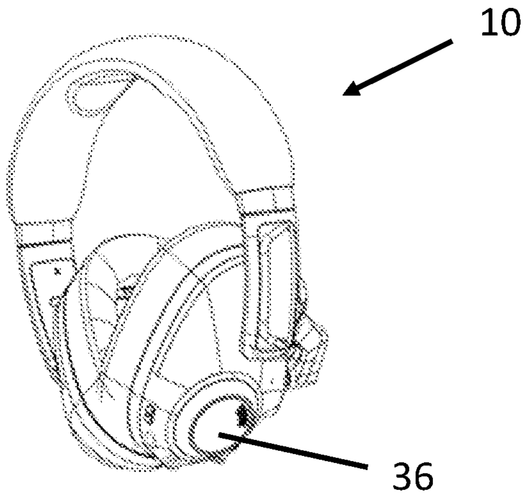

FIG. 3 schematically illustrates the headset 10 with a cover plate mounted 36. The cover plate 36 provides protection of the recess 18 from dust and/or other debris. The cover plate 36 is intended to be placed over the recess 18 when the user detach the arm 20. The user could wish to detach the arm 20 when the user wishes to use the headset 10 when walking or being outside his/her house, but not needing the arm 20. The headset 10 without the arm 20 could be considered less obtrusive by the user, and, detaching the arm 20 from the headset could be done while the user, e.g., is engaged in a game on a handheld device, such as a smartphone or the like. The headset 10 would then be able to transition between operation modes without the user loosing connection to the device. The user could be engaged in a conversation via a softphone application on a smartphone while being at the office but needs to leave the office while maintaining the connection to the call. By detaching the arm 20 from the headset, the headset 10 detect the configuration change and automatically switch to a mode where a microphone in the headset is used to provide a signal representing the user's voice to the far end of the call. Similar, if the arm 20 is detached and the user attach the arm 20 while in a call, the headset 10 could be configured to automatically switch to a mode where at least the microphone 30 in the arm 20 is used to provide a signal comprising the user's voice.

Figure 5:
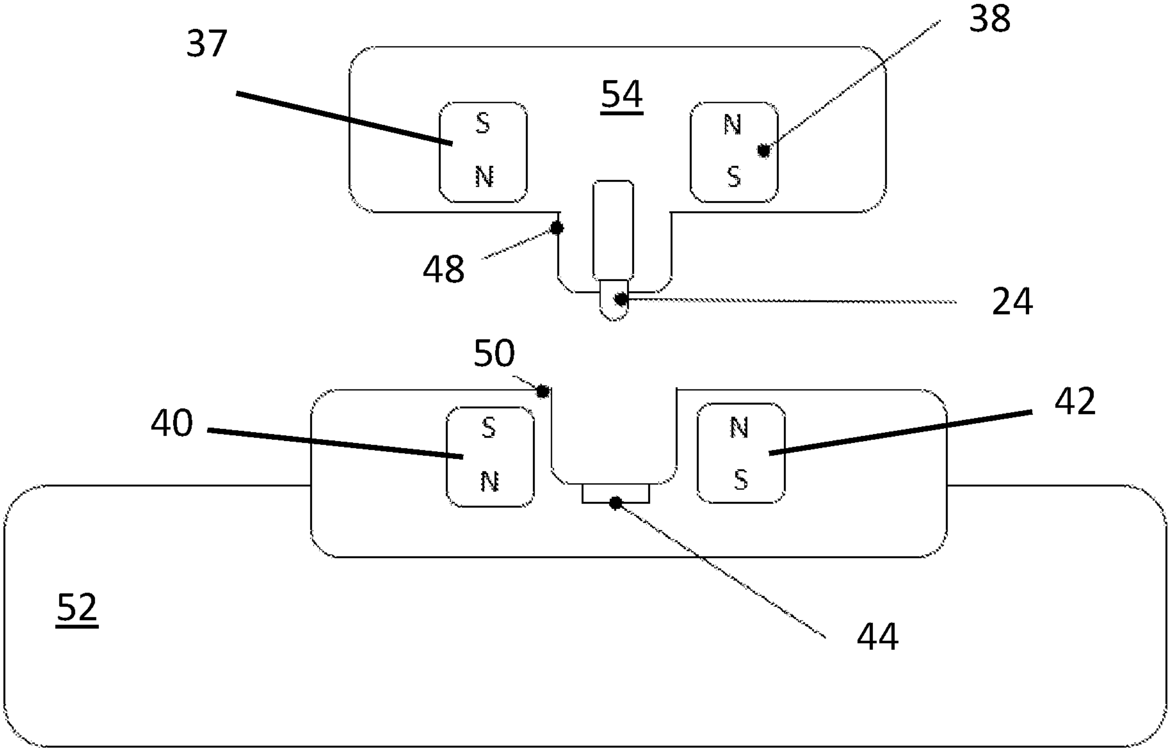

FIG. 5 schematically illustrates a conceptual interface between a detachable boom arm 20 and a headset 10 in a cross-sectional view. In the arm 20, a section 54 thereof is configured to attach to a section or part of the earcup as discussed above. The section 54 comprises first 37 and second 38 magnets. These are arranged symmetrically at a mechanical interface 48. As shown here, the first and second magnets 37, 38 are arranged with opposite polarities. In the arm 52, a second mechanical interface 50 is provided. The second mechanical interface 50 is configured to mate with the first mechanical interface 48 of the arm 20. In the headset, third 40 and fourth 42 magnets are arranged symmetrically at the second mechanical interface 50. The third magnet 40 is arranged so that the polarity match with the polarity of the first magnet 37, and, the fourth magnet 42 is arranged so that the polarity match with the second magnet 38. This arrangement is contemplated to allow the arm 20 to be held in place while providing a sufficient retention force which allow the user to manipulate the arm 20 as discussed above regarding rotation of the arm 20 without the arm 20 unintentionally being detached from the earcup of the headset.

A pogo pin 46 in the arm 20 provides an electrical connection to a contact pad 44 in the earcup. As with the headset discussed above, the headset is configured to detect if the arm is attached or not. The headset is then configured to modify the operation of the headset dependent on the arm being attached or not.

It is intended that the structural features of the devices described above, either in the detailed description and/or in the claims, may be combined with steps of the method, when appropriately substituted by a corresponding process.

In the above, the following reference numerals have been used:

10 headset
12 first earcup
14 second earcup
16 headband
18 recess
20 arm/boom arm/detachable arm
22 plug/plug part
24 pogo pin
26 pogo pin
28 pogo pin
30 microphone
32 slide switch
34 button
36 cover plate
37 first magnet
38 second magnet
40 third magnet
42 fourth magnet
44 connection pad
46 pogo pin
48 First mechanical interface
50 Second mechanical interface

52 Headset/earcup

54 Arm

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A headset comprising:

a first earcup configured to be positioned at an ear of a wearer, the first earcup comprising at least one microphone, a headband connected to the first earcup and configured to keep the headset arranged at the wearer's head during use of the headset, an arm detachably connectable to the first earcup, wherein the arm comprises at least one microphone, a first mechanical interface at the arm and a second mechanical interface formed in the first earcup configured to removably mate with the first mechanical interface and allowing rotation of the arm with respect to the first earcup, wherein the first mechanical interface is a protrusion and second mechanical interface is a recess, a first magnet at least partially encircling the recess of the first earcup, a second magnet at least partially encircling the protrusion and configured to magnetically mate with the first magnet, a third magnet retained within the first earcup, a fourth magnet retained within the arm and configured to magnetically mate with the third magnet, wherein the first, second, third, and fourth magnets are arranged symmetrically around the respective protrusion and recess and configured to retain the arm with the first earcup while rotating the arm with respect to the first earcup, wherein the first mechanical interface or the second mechanical interface comprises a plurality of mechanic stops configured to stop rotation of the arm with respect to the first earcup, and wherein the recess comprises an electrical interface providing electrical communication between the at least one microphone in the arm and a processor in the headset.

2. The headset according to claim 1, wherein the headset comprises a second earcup configured to be positioned at an ear of the wearer opposite of the first earcup.

3. The headset according to claim 1, wherein the headset is configured to operate in a first mode when the arm is in a connected state and in a second, different, mode when the arm is not connected, wherein the first mode comprises establishing a signal based on the at least one microphone in the arm and the at least one microphone in the earcup, and the second mode comprises a signal based on the at least one microphone in earcup.

4. The headset according to claim 1, wherein the headset is configured to mute microphone signals when the arm is attached and in a substantial vertical configuration.

5. The headset according to claim 1, wherein the first earcup comprises at least two microphones, wherein at least two of the at least two microphones are arranged so that the combined microphone signal is directed towards the wearer's mouth.

6. The headset according to claim 1, further comprising at least one microphone connected to an active noise cancellation circuit.

7. The headset according to claim 1, wherein the electrical interface comprises an electrical socket and a corresponding plug constituting the electrical interface.

8. The headset according to claim 1, wherein the electrical interface comprises a set of pogo pins and corresponding set of electrical pads.

9. The headset according to claim 1, further comprising a wired or a wireless interface configured to communicate with an external device.

10. The headset according to claim 1, further comprising a beamformer established using two or more microphones of the headset.

* * * * *